(12) United States Patent
Zhu et al.

(10) Patent No.: US 11,445,740 B2
(45) Date of Patent: Sep. 20, 2022

(54) STORAGE DEVICE

(71) Applicant: QINGDAO HAIER JOINT STOCK CO., LTD., Qingdao (CN)

(72) Inventors: Xiaobing Zhu, Qingdao (CN); Bo Jiang, Qingdao (CN); Lei Wang, Qingdao (CN); Hao Zhang, Qingdao (CN); Ming Wang, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 736 days.

(21) Appl. No.: 16/466,291

(22) PCT Filed: Dec. 1, 2017

(86) PCT No.: PCT/CN2017/114212
§ 371 (c)(1),
(2) Date: Jun. 3, 2019

(87) PCT Pub. No.: WO2018/099461
PCT Pub. Date: Jun. 7, 2018

(65) Prior Publication Data
US 2020/0060317 A1 Feb. 27, 2020

(30) Foreign Application Priority Data

Dec. 2, 2016 (CN) .......................... 201611113529.X

(51) Int. Cl.
*F25D 17/04* (2006.01)
*A23L 3/3418* (2006.01)
(Continued)

(52) U.S. Cl.
CPC ............ *A23L 3/3418* (2013.01); *A23B 7/148* (2013.01); *B01D 53/228* (2013.01);
(Continued)

(58) Field of Classification Search
CPC ................. F25D 17/042; F25D 25/025; F25D 2317/041; A23L 3/3418; B01D 53/228; C01B 13/0251
See application file for complete search history.

(56) References Cited

U.S. PATENT DOCUMENTS 2,894,845 A * 7/1959 Stoddard ............... F25D 17/042
62/89
4,539,737 A * 9/1985 Kerpers ................ F25D 23/006
29/423

(Continued)

FOREIGN PATENT DOCUMENTS

| CN | 101000191 A | 7/2007 |
| CN | 201251336 Y | 6/2009 |

(Continued)

OTHER PUBLICATIONS

JP2015094553A Translation (Year: 2015).*
JPH05227881 English Translation (Year: 1993).*

*Primary Examiner* — David J Teitelbaum
(74) *Attorney, Agent, or Firm* — Cheng-Ju Chiang

(57) ABSTRACT

The present invention provides a storage device, including: a box body, a gas separator, and a gas extractor, wherein the gas extractor is communicated with the gas separator. The storage device of the present invention may form a nitrogen-rich and oxygen-deficient atmosphere beneficial to food freshness preservation.

9 Claims, 6 Drawing Sheets

(51) Int. Cl.
*A23B 7/148* (2006.01)
*B01D 53/22* (2006.01)
*C01B 13/02* (2006.01)
*F25D 25/02* (2006.01)

(52) U.S. Cl.
CPC ........ *C01B 13/0251* (2013.01); *F25D 17/042* (2013.01); *F25D 25/025* (2013.01); *F25D 2317/041* (2013.01)

(56) References Cited

U.S. PATENT DOCUMENTS

| | | | | |
|---|---|---|---|---|
| 5,136,853 | A * | 8/1992 | Girardon | F25D 17/042 62/384 |
| 6,648,295 | B2 * | 11/2003 | Herren | F16F 15/0275 248/562 |
| 2004/0096341 | A1 * | 5/2004 | Hung | F16F 1/3732 417/363 |
| 2004/0173426 | A1 * | 9/2004 | Athanasiou | F16F 3/04 188/378 |
| 2007/0017388 | A1 * | 1/2007 | Lee | F25D 17/042 99/467 |
| 2008/0196440 | A1 * | 8/2008 | Kang | F25D 17/065 62/407 |

FOREIGN PATENT DOCUMENTS

| | | | | |
|---|---|---|---|---|
| CN | 101766321 | A | | 7/2010 |
| CN | 106766516 | A | | 5/2017 |
| CN | 206440052 | U | | 8/2017 |
| JP | H5-5585 | A | | 1/1993 |
| JP | H05227881 | A | * 9/1993 | ............ F25D 23/00 |
| JP | 2015-94553 | A | | 5/2015 |
| JP | 2015094553 | A | * 5/2015 | ............ F25D 23/00 |
| KR | 10-2005-0088742 | A | | 9/2005 |

\* cited by examiner

STORAGE DEVICE

CROSS-REFERENCE TO RELATED APPLICATION

The present application is a 35 U.S.C. § 371 National Phase conversion of International (PCT) Patent Application No. PCT/CN2017/114212, filed on Dec. 1, 2017, which claims priority of Chinese Patent Application No. 201611113529.X, filed on Dec. 2, 2016 and titled "Storage device", which is incorporated herein by reference in its entirety. The PCT International Patent Application was filed and published in Chinese.

TECHNICAL FIELD

The present invention relates to the technical field of item storage, and in particular, to a storage device.

BACKGROUND

As living standards rise, consumers have increasingly high requirements with respect to the freshness preservation of stored food, especially, the color, taste, and the like of food. Therefore, it should be ensured that the color, taste, freshness, and the like of stored food are unchanged as much as possible during storage. At present, there is only vacuum freshness preservation in the market for better food storage. Commonly used vacuum freshness preservation manners are freshness preservation with a vacuum bag and freshness preservation with a vacuum storage compartment.

When the vacuum bag is adopted for freshness preservation, a consumer needs to create a vacuum every time to store food, and complex operations make this manner unappealing to consumers.

When the vacuum storage compartment is adopted for freshness preservation, because a box body or the like has a rigid structure, there is a high requirement for an evacuation system to maintain a vacuum state, and a storage compartment needs to have high sealing performance. A large amount of new air flows into the storage compartment every time an item is taken from or put in the storage compartment, and thus, considerable energy is consumed. In addition, because of a vacuum environment, it usually takes an effort for a user to open the door or the like of the storage compartment, causing use inconvenience to the user. For some storage compartments, an evacuation system may be used to feed air into a vacuum storage compartment. However, a user needs to wait for a relatively long time, resulting in time inefficiency. When a vacuum is maintained for a relatively long time, a box body and the like of a storage compartment may deform severely. That is, an existing storage compartment with an evacuation structure cannot adequately accomplish vacuum freshness preservation. The box body and the like need to have great strength, and thus, implementation requirements and costs are higher.

In addition, the inventor finds that because conventional nitrogen generation equipment applied to controlled-atmosphere freshness preservation has a huge size and requires high costs, the technology is basically restricted to various large-scale specialized storage warehouses (the warehousing capacity is generally at least 30 tons). Persons skilled in the field of controlled-atmosphere freshness preservation have always been trying to solve the technical problem of using an appropriate gas modification technology and a corresponding apparatus to economically make a small and silent controlled-atmosphere system suitable for home or individual users.

SUMMARY

An object of the present invention is to provide a storage device using controlled-atmosphere freshness preservation to overcome at least one disadvantage of an existing storage device. Innovatively, a gas separator separates at least a part of oxygen from air, so that the remaining nitrogen-rich gas is fed into a controlled-atmosphere freshness preservation space to obtain a nitrogen-rich and oxygen-deficient atmosphere beneficial to food freshness preservation in the controlled-atmosphere freshness preservation space. With the atmosphere, the content of oxygen in a fruit and vegetable preservation space is reduced, so as to reduce the intensity of aerobic respiration of fruits and vegetables while ensuring basal respiration to prevent anaerobic respiration of the fruits and vegetables, thereby preserving the freshness of the fruits and vegetables for a long time.

A further object of the present invention is to provide a gas separator having a small size, high strength, and an effective oxygen-removing effect, so as to supply nitrogen-rich gas to a household storage device for freshness preservation.

In particular, the present invention provides a storage device, including:

a box body, wherein the box body has at least one controlled-atmosphere freshness preservation space;

a gas separator, wherein the gas separator has a controlled-atmosphere membrane, the gas separator is configured to: suck in a part of air outside the gas separator, and separate more oxygen than nitrogen from the part of air by means of the controlled-atmosphere membrane to form oxygen-rich gas, so that the remaining gas except the oxygen-rich gas in the part of air that enters the gas separator is fed into the controlled-atmosphere freshness preservation space; and a gas extractor, communicated with the gas separator via a pipe, and configured to enable the oxygen-rich gas to flow out of the gas separator.

Optionally, the gas separator further includes:

a gas collection box, wherein a horizontally placed support frame is disposed in the gas collection box, the support frame and an upper half box body of the gas collection box together define a first gas collection cavity, and the support frame and a lower half box body of the gas collection box together define a second gas collection cavity, wherein the controlled-atmosphere membrane is horizontally disposed on the support frame, and is configured to: enable more oxygen than nitrogen in the air that enters the first gas collection cavity to pass through the controlled-atmosphere membrane to enter the second gas collection cavity, so as to form the oxygen-rich gas in the second gas collection cavity, and form the remaining gas in the first gas collection cavity.

Optionally, the storage device further includes:

a fan, disposed on a flow path from the first gas collection cavity to the controlled-atmosphere freshness preservation space, and configured to enable the remaining gas in the first gas collection cavity to flow to the controlled-atmosphere freshness preservation space.

Optionally, three vent holes controllable to be opened are formed in the gas collection box, and are respectively a first vent hole allowing the part of air to enter the first gas collection cavity of the gas separator, a second vent hole allowing the remaining gas to enter the controlled-atmosphere freshness preservation space, and a third vent hole allowing the oxygen-rich gas to flow out of the second gas collection cavity; and the fan is configured to be turned on as the second vent hole is opened.

Optionally, the second vent hole is configured to be opened after a delay, and when the first vent hole is opened, the second vent hole waits for a preset time period before being opened, so as to enable the remaining gas to flow to the controlled-atmosphere freshness preservation space.

Optionally, the storage device further includes:

a refrigeration system, disposed in the box body, and configured to supply cooled air to the controlled-atmosphere freshness preservation space.

Optionally, a storage space is defined in the box body;

a storage container is disposed in the storage space; and the controlled-atmosphere freshness preservation space is located in the storage container.

Optionally, the storage container is a drawer assembly, including:

a drawer cylinder, having a front opening, and disposed in the storage space; and a drawer body, slidably disposed in the drawer cylinder, so as to be operably pulled out or pushed in the drawer cylinder at the front opening of the drawer cylinder.

Optionally, a mounting cavity is provided in the box body; and the gas extractor is located at an end of the mounting cavity.

Optionally, the gas extractor further includes:

a mounting bottom plate, mounted on a bottom surface of the mounting cavity via a plurality of vibration reduction pads; and a sealed box, mounted on the mounting bottom plate.

The storage device of the present invention includes the gas separator having the controlled-atmosphere membrane to separate gas into oxygen-rich gas with a relatively high oxygen content and nitrogen-rich gas with a relatively high nitrogen content, so that the nitrogen-rich and oxygen-deficient atmosphere beneficial to food freshness preservation may be formed in the controlled-atmosphere freshness preservation space filled with the nitrogen-rich gas. With the atmosphere, the content of oxygen in a fruit and vegetable preservation space is reduced, so as to reduce the intensity of aerobic respiration of fruits and vegetables while ensuring basal respiration to prevent anaerobic respiration of the fruits and vegetables, thereby preserving the freshness of the fruits and vegetables for a long time.

Further, the gas separator in the storage device of the present invention is of an inflation type, so as to provide the controlled-atmosphere freshness preservation space with sufficient nitrogen-rich gas, thereby solving the problem in the prior art that excessively large negative pressure is generated in a storage compartment using vacuum freshness preservation, so that it is more convenient for the user to put an item in or take the item from the controlled-atmosphere freshness preservation space.

The foregoing and other objects, advantages, and features of the present invention will become apparent from the following detailed description of the specific embodiments of the present invention with reference to the accompanying drawings.

BRIEF DESCRIPTION OF THE DRAWINGS

Some specific embodiments of the present invention will be described below in detail with reference to the accompanying drawings in an exemplary manner rather than a limitative manner. The same reference numerals in the accompanying drawings represent the same or similar components or parts. Persons skilled in the art should understand that these accompanying drawings are not necessarily drawn to scale. In the accompanying drawings.

DETAILED DESCRIPTION

Figure 1:
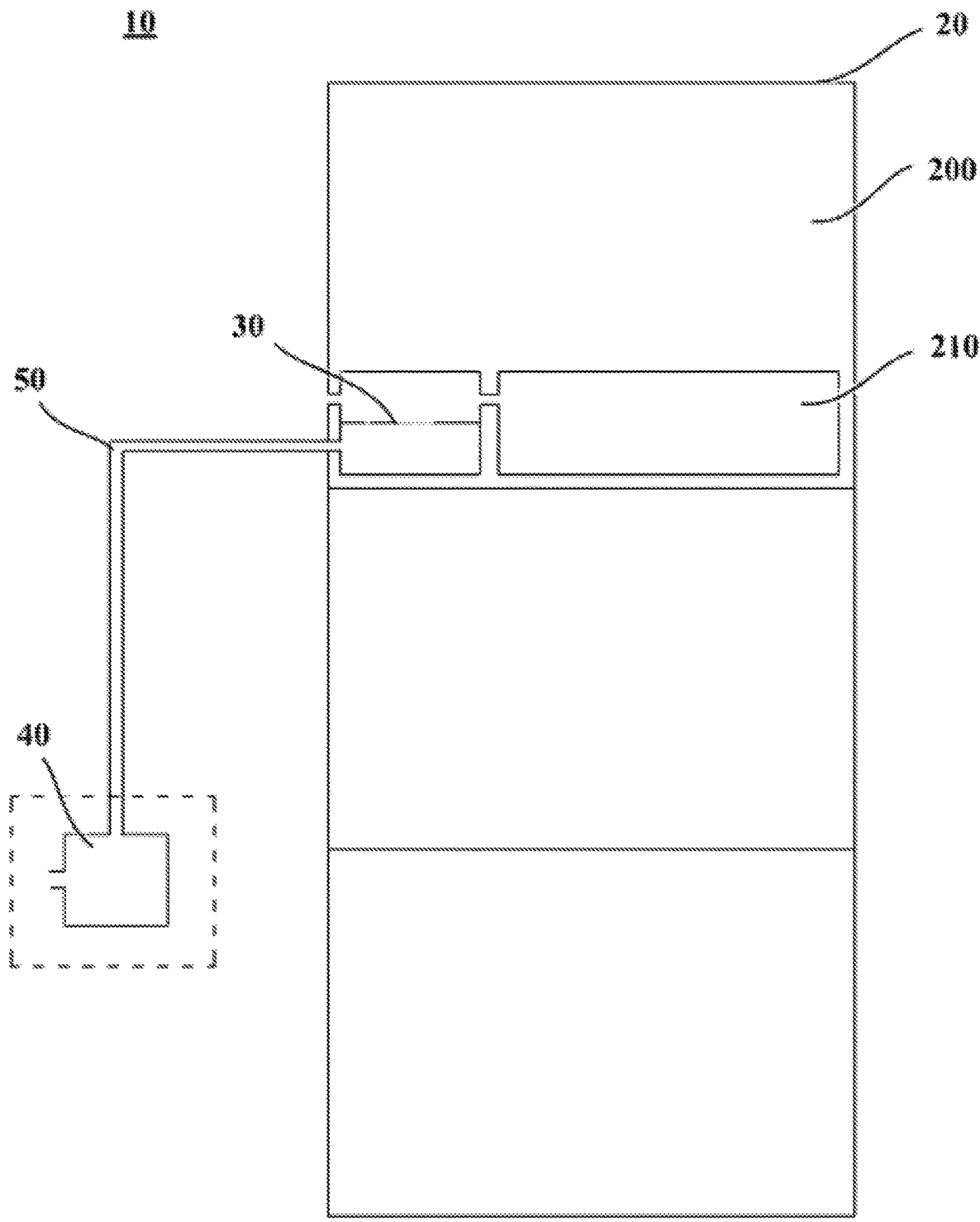
FIG. 1 is a schematic structural diagram of a storage device according to an embodiment of the present invention.
Figure 2:
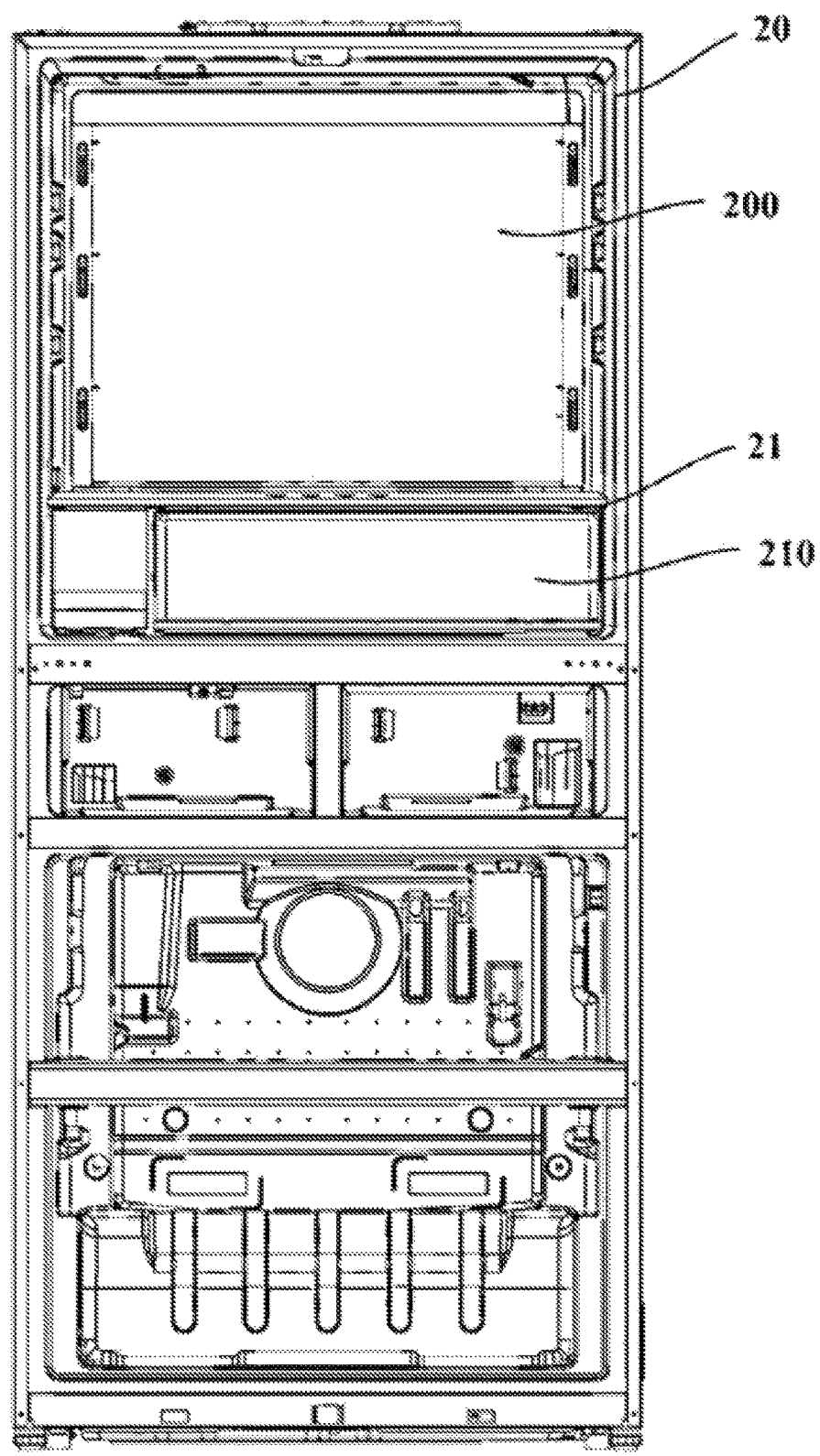
FIG. 2 is a schematic front view of a storage device according to an embodiment of the present invention.
Figure 3:
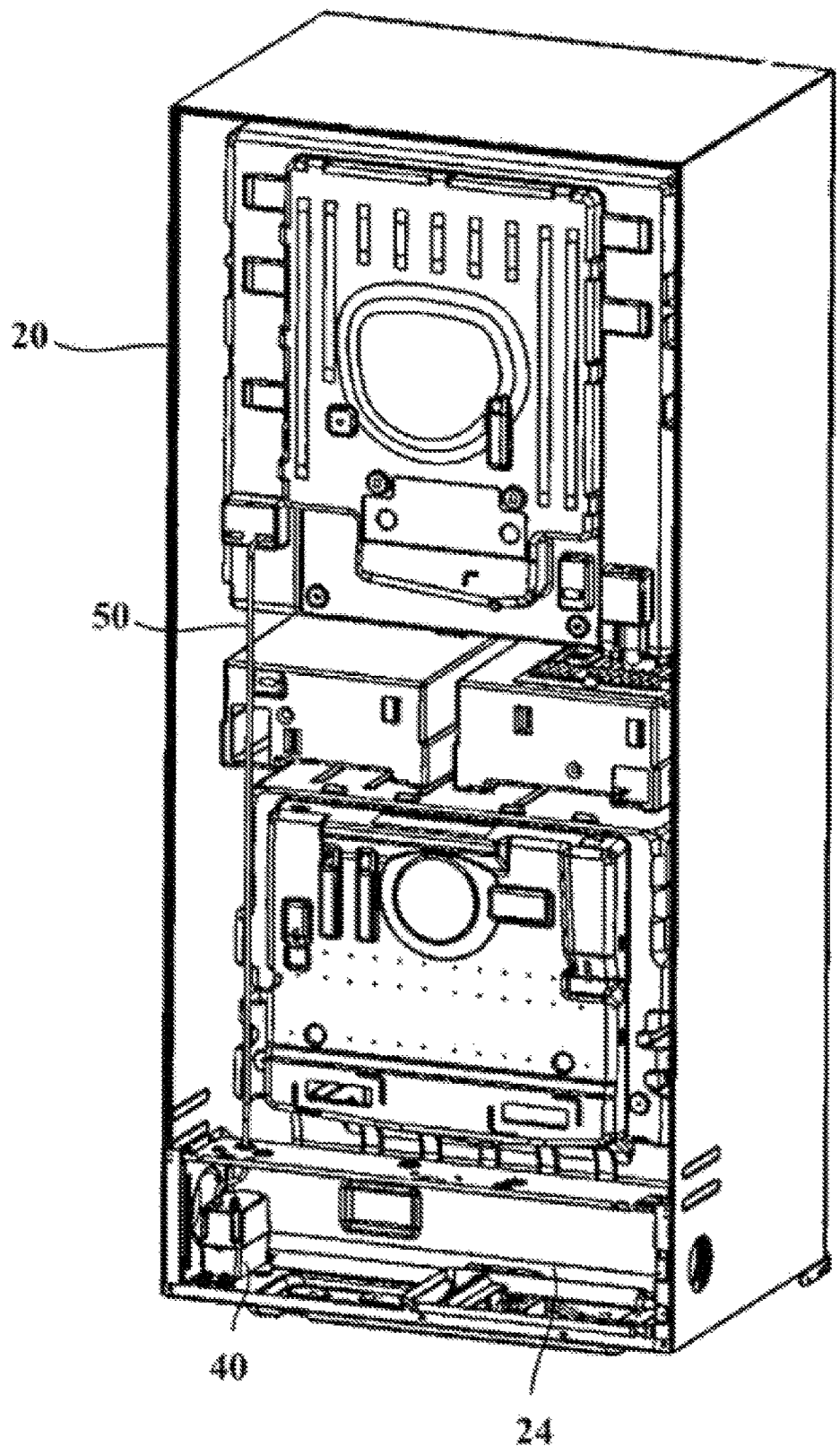
FIG. 3 is a schematic structural diagram of the apparatus shown in FIG. 2 from another viewing angle.
Figure 4:
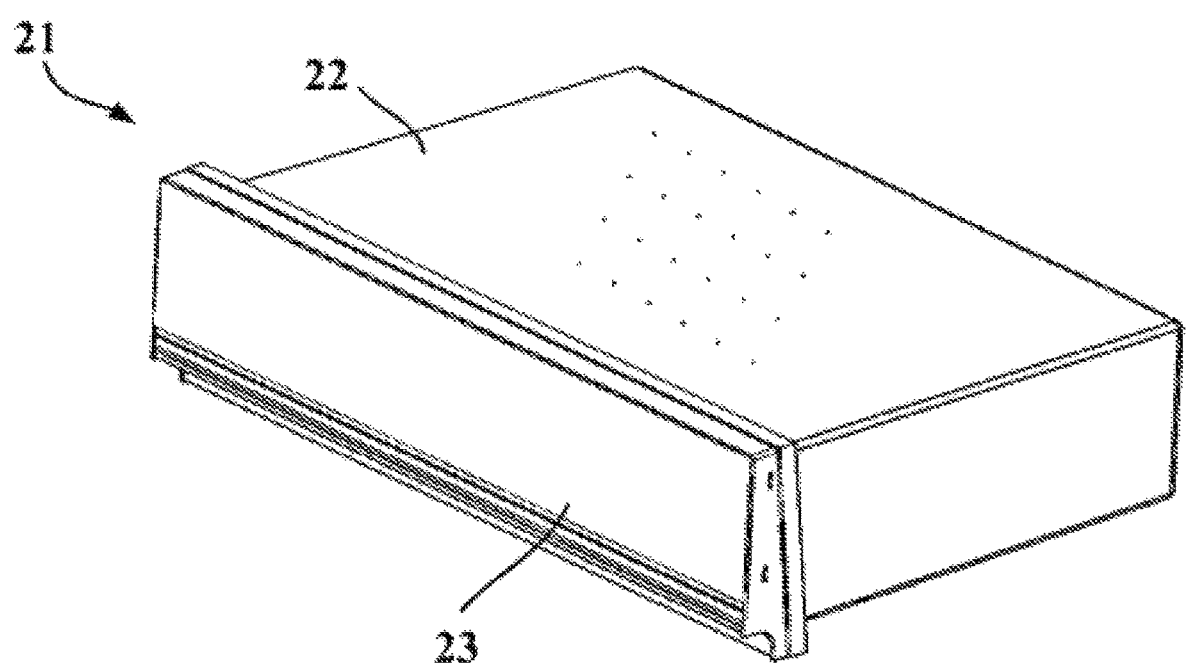
FIG. 4 is a schematic diagram of a storage container in a storage device according to an embodiment of the present invention.

FIG. 1 is a schematic structural diagram of a storage device according to an embodiment of the present invention. FIG. 2 is a schematic front view of a storage device according to an embodiment of the present invention. FIG. 3 is a schematic structural diagram of the apparatus shown in FIG. 2 from another viewing angle. FIG. 4 is a schematic diagram of a storage container in a storage device according to an embodiment of the present invention. As shown in FIG. 1 to FIG. 4, the embodiments of the present invention provide a storage device 10. The storage device 10 may include a box body 20, a gas separator 30, and a gas extractor 40. The box body 20 has at least one controlled-atmosphere freshness preservation space 210. To preserve food, the controlled-atmosphere freshness preservation space 210 may be a sealed space or an approximately sealed space. In some optional embodiments, the storage device 10 further includes a door body for opening or closing the controlled-atmosphere freshness preservation space 210. The door body is rotatably mounted on the box body 20.

In some embodiments of the present invention, a storage space 200 is further defined in the box body 20 of the storage device 10. A storage container 21 may be disposed in the storage space 200. The controlled-atmosphere freshness preservation space 210 is located in the storage container 21. Further, the storage container 21 may be preferably a drawer assembly. The drawer assembly may include a drawer body 23 disposed in the storage space 200 and a drawer cylinder 22 having a front opening. The drawer body 23 is slidably mounted in the drawer cylinder 22, so as to be operably pulled out or pushed in the drawer cylinder 22 at the front opening of the drawer cylinder 22. The drawer body 23 may further have a drawer end cover. The drawer end cover may fit with the opening of the drawer cylinder 22 to seal the controlled-atmosphere freshness preservation space 210.

The gas separator 30 has a controlled-atmosphere membrane 300. The controlled-atmosphere membrane 300 may be an oxygen-enrichment membrane. The gas separator 30 may be configured to: suck in a part of air in an external environment of the gas separator 30, and separate more oxygen than nitrogen from the part of air by means of the controlled-atmosphere membrane 300 to form oxygen-rich gas, so that the remaining gas except the oxygen-rich gas in the part of air that enters the gas separator 30 is fed into the controlled-atmosphere freshness preservation space 210 to obtain a nitrogen-rich and oxygen-deficient atmosphere beneficial to food freshness preservation in the controlled-atmosphere freshness preservation space 210. The gas extractor 40 is communicated with the gas separator 30 via a pipe 50, and is configured to enable the oxygen-rich gas to flow out of the gas separator 30. An air pump 41 may be disposed in the gas extractor 40.

That is, when gas pressure in the gas separator 30 is lower than pressure in the external environment, air in the external environment is sucked into the gas separator 30 due to a pressure difference. Specifically, the controlled-atmosphere membrane 300 may be configured to enable, when a part of ambient air that enters the gas separator 30 is in contact with one side of the controlled-atmosphere membrane 300, more oxygen than nitrogen in the part of ambient air to pass through the controlled-atmosphere membrane 300 and gather on the other side of the controlled-atmosphere membrane 300 to form the oxygen-rich gas. The oxygen-rich gas may be subsequently extracted by the gas extractor 40 communicated with the gas separator 30, so as to reduce the gas pressure in the gas separator 30, thereby enabling the air in the external environment to keep entering the gas separator 30, At least a part of oxygen in the air is separated and then extracted by the gas extractor 40. Further, the remaining gas that is in the ambient air and does not pass through the controlled-atmosphere membrane 300 may be supplied by the gas separator 30 to the controlled-atmosphere freshness preservation space 210, so as to form a nitrogen-rich and oxygen-deficient atmosphere beneficial to food freshness preservation in the controlled-atmosphere freshness preservation space 210. With the atmosphere, the content of nitrogen in a fruit and vegetable preservation space is increased, so as to reduce the intensity of aerobic respiration of fruits and vegetables while ensuring basal respiration to prevent anaerobic respiration of the fruits and vegetables, thereby preserving the freshness of the fruits and vegetables for a long time.

Figure 5:
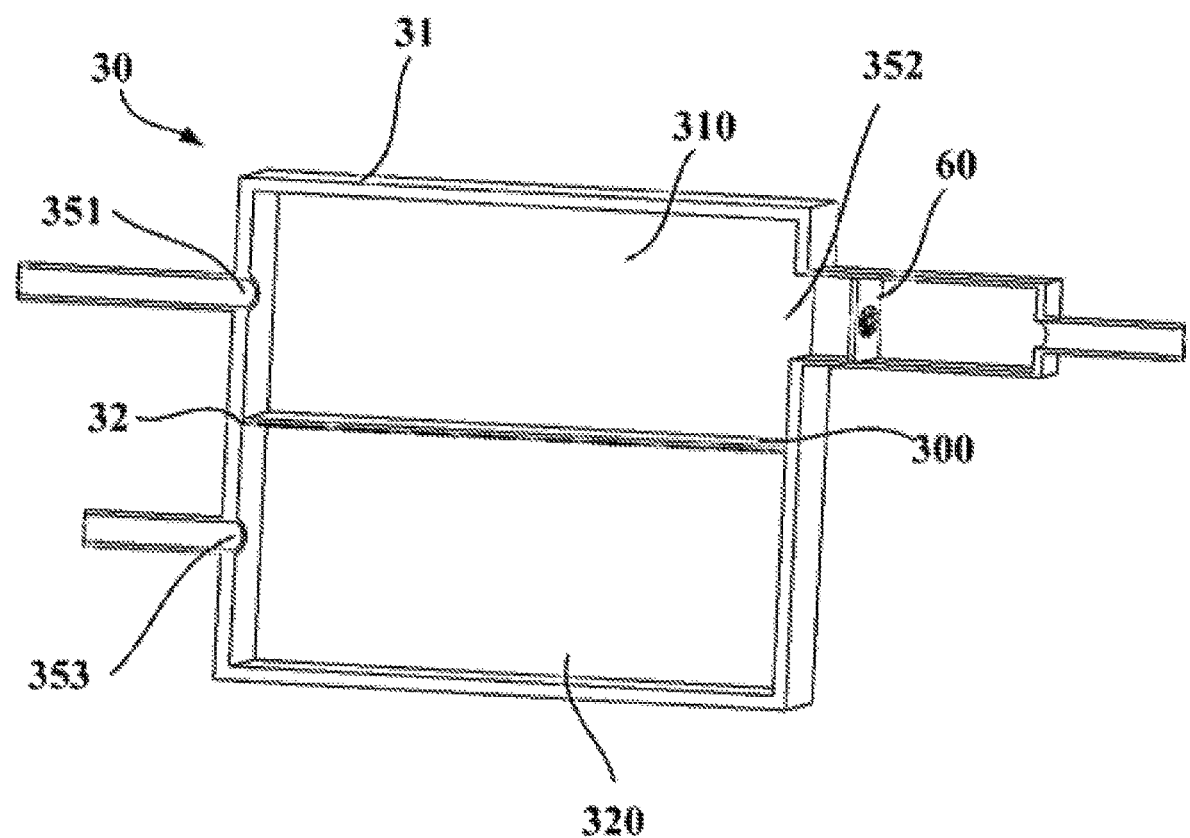
FIG. 5 is a schematic sectional view of a gas separator in a storage device according to an embodiment of the present invention.

FIG. 5 is a schematic sectional view of a gas separator in a storage device according to an embodiment of the present invention. As shown in FIG. 5, in some embodiments of the present invention, the gas separator 30 further includes a gas collection box 31. A horizontally placed support frame 32 is disposed in the gas collection box 31. The support frame 32 and an upper half box body of the gas collection box 31 together define a first gas collection cavity 310, and the support frame 32 and a lower half box body of the gas collection box 31 together define a second gas collection cavity 320.

The controlled-atmosphere membrane 300 may be horizontally disposed on the support frame 32, and may be configured to: when pressure in the first gas collection cavity 310 is higher than pressure in the second gas collection cavity 320, enable more oxygen than nitrogen in the part of air that enters the first gas collection cavity 310 to pass through the controlled-atmosphere membrane 300 to enter the second gas collection cavity 320, so as to form the oxygen-rich gas in the second gas collection cavity 320, and form the remaining gas, namely, nitrogen-rich gas, except the oxygen-rich gas in the first gas collection cavity 310.

The controlled-atmosphere membrane is permeable to all gases. However, different gases have different levels of permeation. It is a complex process for a gas to pass through the controlled-atmosphere membrane. Generally, in a permeation mechanism, gas molecules are first adsorbed on the surface of the controlled-atmosphere membrane and are dissolved, then diffuse in the controlled-atmosphere membrane, and are eventually desorbed from the other side of the controlled-atmosphere membrane. In a separation technology using the controlled-atmosphere membrane, gases are separated based on difference solubility coefficients and diffusion coefficients of different gases in the controlled-atmosphere membrane. In the present invention, the controlled-atmosphere membrane may be an oxygen-enrichment membrane. In this case, when mixed gases are driven by a force (a pressure difference or pressure ratio between two sides of the oxygen-enrichment membrane), gases such as oxygen, hydrogen, helium, hydrogen sulfide, and carbon dioxide having relatively high permeation rates are enriched on a permeation side of the oxygen-enrichment membrane after passing through the oxygen-enrichment membrane; and gases such as nitrogen and carbon monoxide having relatively low permeation rates are retained on a retention side of the oxygen-enrichment membrane and concentrate, so that the mixed gases are separated.

It is known to all persons skilled in the art that the constituents of normal air include (by volume percentage, the same below): about 78% nitrogen, about 21% oxygen, about 0.939% noble gas (helium, neon, argon, krypton, xenon, and radon), 0.031% carbon dioxide, and 0.03% other gases and impurities (for example, ozone, nitric oxide, nitrogen dioxide, water vapor, and the like). In the field of controlled-atmosphere freshness preservation, nitrogen-rich gas is usually fed into an enclosed space to reduce the oxygen content to obtain a nitrogen-rich and oxygen-deficient freshness preservation atmosphere. Herein, it is known to all persons skilled in the art that the nitrogen-rich gas is gas with nitrogen content higher than the nitrogen content in the normal air. For example, the nitrogen content in the nitrogen-rich gas may be 95% to 99% or even higher. The nitrogen-rich and oxygen-deficient freshness preservation atmosphere is an atmosphere with nitrogen content higher than the nitrogen content in the normal air and oxygen content lower than the oxygen content in the normal air.

Specifically, in some embodiments of the present invention, the gas extractor 40 may be communicated with the second gas collection cavity 320, namely, the lower half box body of the gas collection box 31, of the gas separator 30 via the pipe 50. The gas extractor 40 extracts gas to the outside to enable the oxygen-rich gas in the second gas collection cavity 320 to flow out via the pipe 50, so as to reduce the pressure in the second gas collection cavity 320. When the pressure in the second gas collection cavity 320 is lower than the pressure in the first gas collection cavity 310, more oxygen than nitrogen in the air in the first gas collection cavity 310 passes through the controlled-atmosphere membrane 300 to enter the second gas collection cavity 320. In this case, gases such as oxygen that have relatively high permeation rates in the first gas collection cavity 310 enter the second gas collection cavity 320, and other gases that have relatively low permeation rates and contain only a small amount of oxygen or no oxygen are formed in the first gas collection cavity 310. That is, the nitrogen-rich gas is formed. Further, the pressure in the first gas collection cavity 310 decreases because the gases such as oxygen that have relatively high permeation rates in the air in the first gas collection cavity 310 decrease, so as to enable air in the external environment to enter the first gas collection cavity 310 due to a pressure difference. Under the effect of the gas extractor 40 and the controlled-atmosphere membrane 300, the gases such as oxygen that have relatively high permeation rates in the air that enters the first gas collection cavity 310 are continuously discharged into the second gas collection cavity 320. That is, the gas extractor 40 extracts gases to the outside to enable the air in the external environment to keep entering the gas separator 30. Moreover, under the effect of the controlled-atmosphere membrane 300, a large amount of nitrogen-rich gas is formed in the first gas collection cavity 310 and is fed into the controlled-atmosphere freshness preservation space 210.

In some embodiments of the present invention, three vent holes controllable to be opened may be further formed in the gas collection box 31. The three vent hole may be respectively, a first vent hole 351 allowing the air in the external environment to enter the first gas collection cavity 310, a second vent hole 352 allowing the remaining gas (namely, the nitrogen-rich gas) except the gases such as oxygen that have relatively high permeation rates to flow from the first gas collection cavity 310 to the controlled-atmosphere freshness preservation space 210, and a third vent hole 353 allowing the oxygen-rich gas to flow out of the second gas collection cavity 320.

That is, the first gas collection cavity 310 may be communicated with the external environment via the first vent hole 351. Specifically, when the pressure in the first gas collection cavity 310 is lower than the gas pressure in the external environment, the first vent hole 351 is controlled to be opened. In this case, the second vent hole 352 may be controlled to be closed, so that the pressure in the first gas collection cavity 310 increases, and a large amount of nitrogen-rich gas is formed in the first gas collection cavity 310. It may be understood that because only a small amount of gases such as nitrogen that have relatively low permeation rates can pass through the controlled-atmosphere membrane 300 to enter the second gas collection cavity 320, the pressure in the first gas collection cavity 310 keeps increasing. When the pressure in the first gas collection cavity 310 is higher than or equal to the gas pressure in the external environment, the first vent hole 351 may be controllable to be closed. In this case, the second vent hole 352 may be controllable to be opened, so as to enable a large amount of nitrogen-rich gas in the first gas collection cavity 310 to flow to the controlled-atmosphere freshness preservation space 210. The third vent hole 353 may be kept in an open state when the first vent hole 351 and/or the second vent hole 352 is opened, so as to enable the oxygen-rich gas in the second gas collection cavity 320 to be sucked out by the gas extractor 40 in time, thereby enabling the air in the external environment to keep flowing into the first gas collection cavity 310.

In some embodiments of the present invention, the second vent hole 352 may be configured to be opened after a delay. Specifically, when the first vent hole 351 is opened, the second vent hole 352 waits for a preset time period before being opened, so as to form sufficient nitrogen-rich gas in the first gas collection cavity 310.

In some embodiments of the present invention, the storage device 10 may further include a fan 60. The fan 60 may be disposed on a flow path from the first gas collection cavity 310 to the controlled-atmosphere freshness preservation space 210, and configured to be controllable to be turned on, so as to enable the remaining gas, except the gases such as oxygen that have relatively high permeation rates and have passed through the controlled-atmosphere membrane 300 to enter the second gas collection cavity 320, in the first gas collection cavity 310 to flow to the controlled-atmosphere freshness preservation space 210 at a higher speed. Specifically, the fan 60 may be disposed in a manner that an air inlet of the fan 60 faces the first gas collection cavity 310 and an air outlet of the fan 60 faces the controlled-atmosphere freshness preservation space 210, so as to enable the nitrogen-rich gas that flows out of the first gas collection cavity 310 to flow to the controlled-atmosphere freshness preservation space 210 at a higher speed. Further, the fan 60 may be configured to be turned on as the second vent hole 352 is opened. In some embodiments of the present invention, the fan 60 may be preferably an axial-flow fan.

In some embodiments of the present invention, the storage device 10 may further include a refrigeration system. The refrigeration system may be disposed in the box body 20, and configured to supply cooled air to the controlled-atmosphere freshness preservation space 210. The storage device 10 having the refrigeration system may usually also be referred to as a refrigerating and freezing apparatus, for example, may be a refrigerator that at least has a refrigerating compartment and a freezing compartment. The refrigeration system may be a common compression refrigeration system, semiconductor refrigeration system or the like, and supplies cooled air to a storage compartment in a direct-cooling form and/or an air-cooling form, so as to provide the storage compartment with expected storage temperature. In some embodiments, the storage temperature of the refrigerating compartment of the refrigerator may be 2° C. to 9° C. or may be 4° C. to 7° C. The storage temperature of the freezing compartment may be −22° C. to −14° C. or may be −20° C. to −16° C. This type of refrigeration system is well known and can be readily implemented by persons skilled in the art. In order not to hide or obscure the inventive concept of this application, details of the refrigeration system are not further described hereinafter.

In some embodiments of the present invention, a mounting cavity 24 may be disposed at a lower portion on a rear side of the box body 20. When the refrigeration system is a compression refrigeration system, the mounting cavity 24 may also be referred to as a compressor compartment. The gas extractor 40 may be disposed in the mounting cavity 24. Specifically, the gas extractor 40 may be mounted at one end of the mounting cavity 24.

Figure 6:
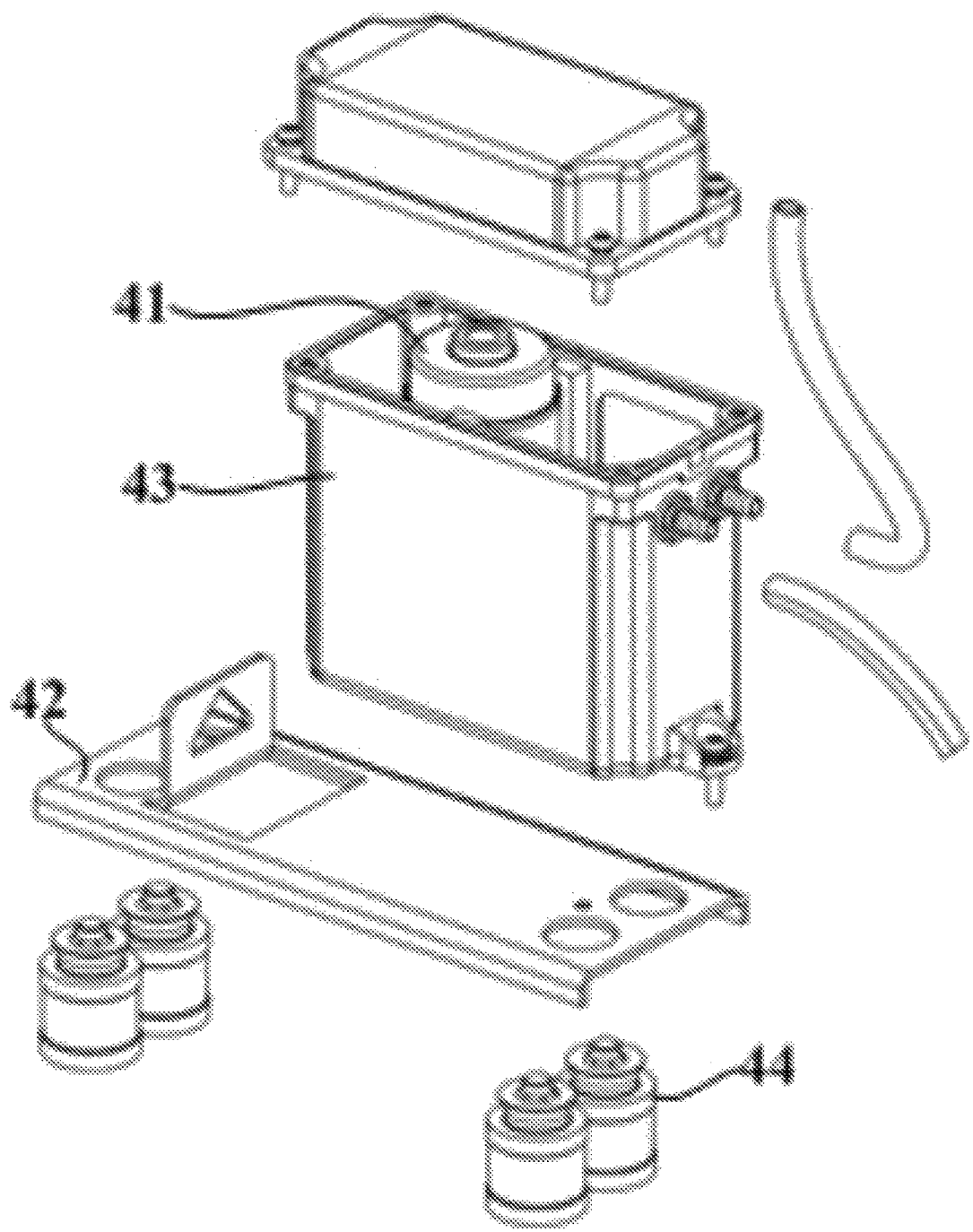
FIG. 6 is a schematic exploded view of a gas extractor in a storage device according to an embodiment of the present invention.

FIG. 6 is a schematic exploded view of a gas extractor 40 in a storage device according to an embodiment of the present invention. As shown in FIG. 6, for the purpose of facilitating mounting of the gas extractor 40, reducing manufacturing costs, and the like, the gas extractor 40 may further include a mounting bottom plate 42 and a sealed box 43. The mounting bottom plate 42 may be mounted on a bottom surface of the mounting cavity 24 via a plurality of vibration reduction pads 44. The sealed box 43 is mounted on the mounting bottom plate 42. The gas extractor 40 is mounted in the sealed box 43. Further, a mounting frame is disposed inside the sealed box 43. The mounting frame is connected to an inner wall of the sealed box 43 via a plurality of vibration reduction blocks. The gas extractor 40 is fixed inside the mounting frame, so as to reduce vibration and noise when the gas extractor 40 runs. Specifically, two vibration reduction blocks are disposed at the bottom of the mounting frame. The vibration reduction block sleeves a positioning column on a bottom surface of the sealed box 43. One circular vibration reduction block is disposed respectively on two opposite sides of the mounting frame, and is clamped in a clamping groove in a corresponding side wall of the sealed box 43. One vibration reduction block is fixed respectively on the other two opposite sides of the mounting frame. The gas extractor 40 may be located among the vibration reduction blocks in the sealed box 43 and is fixed onto the mounting frame via a screw.

In some embodiments of the present invention, a locking apparatus, a handle, and a handle positioning apparatus are disposed between the drawer body 23 and the drawer cylinder 22. The locking apparatus includes pivotal latches disposed on two sides of a drawer end cover 230, two fastening portions disposed on the drawer cylinder 22, and a clamping promotion apparatus. Each fastening portion may be a protrusion. The clamping facilitation apparatus may be configured to promote the two pivotal latches to rotate in directions (namely, respective first directions) to be clamped to respective corresponding fastening portions. The handle extends horizontally, and may be slidably mounted on the drawer end cover 230 in a vertical direction. Moreover, when the drawer body 23 is in a closed state, the handle may be located at an initial position of the handle. In addition, the handle is configured in a manner that when the handle is at the initial position, two ends of the handle contact and abut the two pivotal latches respectively to stop the pivotal latches from rotating in directions opposite the corresponding first directions, so as to keep a fitting state between the pivotal latches and the fastening portions. Thus, the drawer body 23 is locked at the drawer cylinder 22. Further, after the handle moves upwards or downwards to a locking releasing position, namely, moves from the initial position to the locking releasing position, the pivotal latches are allowed to rotate in the directions opposite to the corresponding first directions, so as to allow the pivotal latch to rotate to be disengaged from the corresponding fastening portion when the drawer body 23 is pulled out, thereby allowing the drawer body 23 to be opened. The handle positioning apparatus is configured to keep, after the handle moves to each predetermined position, the handle at the position. The position is mainly the initial position and the locking releasing position. When it is required to open the door body, a user first moves the handle upwards or downwards to the locking releasing position, the handle positioning apparatus keeps the handle at the position, and the user may pull out the drawer body 23. When it is required to close the door body, the user first closes the drawer body 23, and then makes the handle move downwards or upwards to return to the initial position, and the handle positioning apparatus keeps the handle at the position, so that the drawer body 23 and the drawer cylinder 22 are kept in a locked state.

To further ensure stable movement of the handle, a guiding rod and a slider are further respectively disposed at two ends of the handle. The guiding rods extend in a vertical direction. The drawer body 23 further includes two groups of sliding tracks. Each group of the sliding tracks has at least three sliding grooves extending in a vertical direction, so that one sliding groove is formed on each of the two sides of the guiding rod, and the slider moves in the remaining sliding groove; or one sliding groove is formed on each of the two sides of the slider, and the guiding rod moves in the remaining sliding groove. For example, each group of the sliding tracks may include four sliding grooves. One sliding groove is formed on each of the front and rear sides of the guiding rod, and one sliding groove is formed on each of the two transverse sides (namely, the left side and the right side) of the slider.

Here, persons skilled in the art should be aware that although a plurality of exemplary embodiments of the present invention has been shown and described herein, many other variations or modifications conforming to the principle of the present invention may still be directly determined or derived according to the content disclosed in the present invention without departing from the spirit and scope of the present invention. Therefore, all these other variations or modifications should be construed and determined as falling within the scope of the present invention.

What is claimed is:

1. A storage device, comprising:
   a box body, wherein the box body has at least one controlled-atmosphere freshness preservation space;
   a gas separator, wherein the gas separator has a controlled-atmosphere membrane, and is configured to: suck in a part of air outside the gas separator, and separate more oxygen than nitrogen from the part of air by means of the controlled-atmosphere membrane to form oxygen-rich gas, so that a remaining gas except the oxygen-rich gas in the part of air that enters the gas separator is fed into the controlled-atmosphere freshness preservation space; and
   a gas extractor, communicated to the gas separator via a pipe, and configured to enable the oxygen-rich gas to flow out of the gas separator;
   wherein the gas separator further comprises:
      a gas collection box, wherein a horizontally placed support frame is disposed in the gas collection box, the support frame and an upper half box body of the gas collection box together define a first gas collection cavity, and the support frame and a lower half box body of the gas collection box together define a second gas collection cavity; wherein
      the controlled-atmosphere membrane is horizontally disposed on the support frame, and is configured to: enable more oxygen than nitrogen in the air that enters the first gas collection cavity to pass through the controlled-atmosphere membrane to enter the second gas collection cavity, so as to form the oxygen-rich gas in the second gas collection cavity, and form the remaining gas in the first gas collection cavity;
   three vent holes controllable to be opened are formed in the gas collection box, and are respectively a first vent hole allowing the part of air to enter the first gas collection cavity of the gas separator, a second vent hole allowing the remaining gas to enter the controlled-atmosphere freshness preservation space, and a third vent hole allowing the oxygen-rich gas to flow out of the second gas collection cavity.

2. The storage device according to claim 1, wherein the storage device further comprises:
   a fan, disposed on a flow path from the first gas collection cavity to the controlled-atmosphere freshness preservation space, and configured to enable the remaining gas in the first gas collection cavity to flow to the controlled-atmosphere freshness preservation space.

3. The storage device according to claim 2, wherein:
   the fan is configured to be turned on as the second vent hole is opened.

4. The storage device according to claim 3, wherein:
   the second vent hole is configured to be opened after a delay, and when the first vent hole is opened, the second vent hole waits for a preset time period before being opened, so as to enable the remaining gas to flow to the controlled-atmosphere freshness preservation space.

5. The storage device according to claim 1, wherein the storage device further comprises:
   a refrigeration system, disposed in the box body, and configured to supply cooled air to the controlled-atmosphere freshness preservation space.

6. The storage device according to claim 1, wherein:
   a storage space is defined in the box body;
   a storage container is disposed in the storage space; and the controlled-atmosphere freshness preservation space is located in the storage container.

7. The storage device according to claim 6, wherein:
the storage container is a drawer assembly, and the drawer assembly comprises:
   a drawer cylinder, having a front opening, and disposed in the storage space; and
   a drawer body, slidably disposed in the drawer cylinder, so as to be operably pulled out or pushed in the drawer cylinder at the front opening of the drawer cylinder.

8. The storage device according to claim 1, wherein:
a mounting cavity is disposed in the box body; and the gas extractor is located at an end of the mounting cavity.

9. The storage device according to claim 8, wherein the gas extractor further comprises:
   a mounting bottom plate, mounted on a bottom surface of the mounting cavity via a plurality of vibration reduction pads; and
   a sealed box, mounted on the mounting bottom plate.

* * * * *